US011607641B2

(12) United States Patent
Keller et al.

(10) Patent No.: US 11,607,641 B2
(45) Date of Patent: Mar. 21, 2023

(54) METHOD AND SYSTEM FOR EXTRACTING PURE HELIUM

(71) Applicant: Linde GmbH, Pullach (DE)

(72) Inventors: Tobias Keller, Feldkirchen-Westerham (DE); Martin Bauer, Munich (DE); Patrick Schiffmann, Munich (DE)

(73) Assignee: Linde GmbH, Pullach (DE)

( * ) Notice: Subject to any disclaimer, the term of this patent is extended or adjusted under 35 U.S.C. 154(b) by 251 days.

(21) Appl. No.: 16/962,418

(22) PCT Filed: Jan. 10, 2019

(86) PCT No.: PCT/EP2019/025010
§ 371 (c)(1),
(2) Date: Jul. 15, 2020

(87) PCT Pub. No.: WO2019/141508
PCT Pub. Date: Jul. 25, 2019

(65) Prior Publication Data
US 2021/0069633 A1 Mar. 11, 2021

(30) Foreign Application Priority Data
Jan. 22, 2018 (EP) .................................. 18020032

(51) Int. Cl.
*B01D 53/047* (2006.01)
*B01D 53/22* (2006.01)

(52) U.S. Cl.
CPC ......... *B01D 53/047* (2013.01); *B01D 53/225* (2013.01); *B01D 53/229* (2013.01); *B01D 2256/18* (2013.01)

(58) Field of Classification Search
None
See application file for complete search history.

(56) References Cited

U.S. PATENT DOCUMENTS

| 2014/0243574 A1 | 8/2014 | Karode |
| 2016/0184769 A1 | 6/2016 | Kulkarni |

FOREIGN PATENT DOCUMENTS

| WO | 2012/050816 A2 | 4/2012 |
| WO | 2017/020919 A1 | 2/2017 |

OTHER PUBLICATIONS

English Machine Translation of WO2017020919A1 obtained from Espacenet (Year: 2022).*

(Continued)

*Primary Examiner* — Philip Y Louie
(74) *Attorney, Agent, or Firm* — Millen White Zelano & Branigan, PC; Brion P. Heaney

(57) ABSTRACT

The invention relates to a method (200-400) for extracting pure helium using a first membrane separation stage (1), a second membrane separation stage (2), and a third membrane separation stage (3), in which a first helium-containing feed mixture is supplied to the first membrane separation stage (1), a second helium-containing feed mixture is supplied to the second membrane separation stage (2), and a third helium-containing feed mixture is supplied to the third membrane separation stage (3), and in which a first permeate and a first retentate are formed in the first membrane separation stage (1), a second permeate and a second retentate are formed in the second membrane separation stage (2), and a third permeate and a third retentate are formed in the third membrane separation stage (3). According to the invention, the first feed mixture is formed using at least one portion of a helium-containing starting mixture, the second feed mixture is formed using at least one portion of the first permeate, the third feed mixture is formed using at least one portion of the second retentate, the second permeate is at least partially processed by pressure-swing adsorption in order to obtain the pure helium and a remaining mixture, and at least one portion of the third permeate and/or at least one (Continued)

portion of the third retentate is guided back into the method (200). The invention also relates to a corresponding system.

18 Claims, 2 Drawing Sheets

(56) References Cited

OTHER PUBLICATIONS

Häussinger, P. et al., "Noble Gases," Ullmann's Encyclopedia of Industrial Chemistry, first published Mar. 15, 2001, vol. 24, DOI: 10.1002/14356007.a17_485, pp. 392-448.
International Search Report of the International Searching Authority for PCT/EP2019/025010 dated May 24, 2019.
English translation of International Search Report of the International Searching Authority for PCT/EP2019/025010 dated May 24, 2019.

\* cited by examiner

METHOD AND SYSTEM FOR EXTRACTING PURE HELIUM

The invention relates to a method and to a system for extracting pure helium according to the preambles of the independent claims.

PRIOR ART

Methods and systems for extracting helium—in particular, from natural gas—are described in, for example, the article, "Noble Gases," in Ullmann's Encyclopedia of Industrial Chemistry, online edition, Mar. 15, 2001, DOI: 10.1002/14356007.a10_045.pub2. In addition to cryogenic methods, membrane methods are also used to extract helium from natural gas. Combined methods can also be used. For details, reference may be made, for example, to Section 4.2.1.2, "Crude Helium Extraction by Permeation Processes," in the mentioned article.

A corresponding membrane method can, in particular, comprise the use of several membrane separation stages, wherein a helium-enriched permeate and a helium-depleted retentate are formed in each membrane separation stage. Such membrane separation stages can be interconnected in different ways.

For example, in FIG. 23, the mentioned article discloses a method in which a helium-containing feed mixture is supplied to a first membrane separation stage. A permeate of the first membrane separation stage is compressed and supplied to a second membrane separation stage. A permeate of the second membrane separation stage represents the product of the method. A retentate of the first membrane separation stage is removed from the method. A retentate of the second membrane separation stage is guided back to before the first membrane separation stage and is combined with the feed mixture.

A three-stage membrane method is known from US 2014/0243574 A1, in which a helium-containing feed mixture is supplied to a first membrane separation stage. A permeate of the first membrane separation stage is compressed and supplied to a second membrane separation stage. A permeate of the second membrane separation stage contains about 30 mol % helium. It can be further purified to form a helium product or used in the formation of the feed mixture which is supplied to the first membrane separation stage. For this purpose, it is fed into a tank, for example, together with fresh natural gas. A retentate of the second membrane separation stage is supplied to a third membrane separation stage. A permeate of the third membrane separation stage is compressed together with the permeate of the first membrane separation stage and supplied together with it to the second membrane separation stage. Retentates of the first and third membrane separation stages are combined and provided as a natural gas product.

In all methods for extracting helium, distillation or pressure-swing adsorption steps can be used to produce pure helium downstream of a cryogenic or membrane-based enrichment. In this way, high-purity helium products can be provided.

Although the present invention is described predominantly with reference to the extraction of helium from natural gas, in principle, it is equally suitable for other fields of application, e.g., for the recovery of helium from helium-containing gas mixtures which are formed, for example, in the evaporation of helium in cryogenic applications. Corresponding gas mixtures are hereinafter referred to as "starting mixtures."

The aim of the present invention is to improve and more efficiently design the extraction of pure helium from corresponding starting mixtures, using membrane separation stages.

DISCLOSURE OF THE INVENTION

This aim is achieved by a method for extracting pure helium and a corresponding system with the features of the independent claims. Embodiments of the invention are the subject matter of the dependent claims and the description below.

Prior to explaining the advantages of the present invention, some terms used in describing the invention are defined in more detail below.

A "permeate" is understood here to mean a gas or gas mixture which predominantly or exclusively has components which are not or mostly not retained by a membrane used in a membrane separation stage, i.e., which pass through the membrane (essentially, or at least preferably) unimpeded. Accordingly, a "retentate" is a gas or gas mixture which predominantly or exclusively has components that are retained completely or at least predominantly by the membrane used in the membrane separation stage.

Gas mixtures, as the term is used herein, may be rich or poor in one or more components, wherein the term, "rich," may represent a content of at least 90%, 95%, 99%, 99.9%, or 99.99%, and the term, "poor," may represent a content of at most 10%, 5%, 1%, 0.01%, or 0.01% on a molar, weight, or volume basis. Gas mixtures, as the term is used herein, may also be enriched with or depleted of one or more components, wherein such terms refer to a corresponding content in another gas mixture, with the use of which the gas mixture under consideration was formed. The gas mixture under consideration here is "enriched" if it has at least 2 times, 5 times, 10 times, 100 times, or 1,000 times the content of the designated component(s), and is "depleted" if it has at most 0.5 times, 0.1 times, 0.01 times, or 0.001 times the content of the designated component(s).

In particular, "pure helium" here is understood to mean helium with a purity of at least 99.5 (so-called helium 2.5), 99.9 (helium 2.9), 99.95 (helium 3.5), 99.99 (helium 4.0), 99.995 (helium 4.5), 99.999 (helium 5.0), 99.9995 (helium 5.5), 99.9999 (helium 6.0), or 99.99999 mol % (helium 7.0).

Here, when a gas mixture is referred to as being "formed" using another gas mixture, it is to be understood that the gas mixture under consideration has at least some of the components contained in or forming the other gas mixture. Forming a gas mixture from another may comprise, for example, branching off a portion of the gas mixture, adding one or more further components or gas mixture, chemically or physically reacting at least some components, along with heating, cooling, evaporating, condensing, etc. However, "forming" a gas mixture from another gas mixture may also comprise merely providing the other gas mixture or a portion thereof in a suitable form—for example, in a container or a conduit.

The present application uses the terms, "pressure level" and "temperature level," to characterize pressures and temperatures, which is intended to mean that corresponding pressures and temperatures in a corresponding system do not have to be used in the form of exact pressure or temperature values. However, such pressures and temperatures typically fall within certain ranges, which lie, for example, at ±1%, 5%, 10%, 20% or 25% around an average. Corresponding pressure levels and temperature levels can lie in disjointed ranges or in ranges which overlap one another. The same pressure level can also be present, for example, if unavoidable pressure losses occur. The same applies to temperature levels. The pressure levels indicated here in bar are absolute pressures.

The present invention proposes a multi-stage membrane separation method in which a first, a second, and a third membrane separation stage is used, in each of which a permeate and a retentate are formed. The permeate of the first membrane separation stage is hereinafter referred to as the "first" permeate, the permeate of the second membrane separation stage as the "second" permeate, and the permeate of the third membrane separation stage as the "third" permeate. Accordingly, the retentate of the first membrane separation stage is referred to as the "first" retentate, the retentate of the second membrane separation stage as the "second" retentate, and the retentate of the third membrane separation stage as the "third" retentate. Gas mixtures are supplied to each of the membrane separation stages. A gas mixture supplied to the first membrane separation stage is referred to herein as a "first" feed mixture, a gas mixture supplied to the second membrane separation stage as a "second" feed mixture, and a gas mixture supplied to the third membrane separation stage as a "third" feed mixture.

Within the framework of the present invention, it is provided that the first feed mixture be formed using at least one portion of a helium-containing starting mixture, i.e., for example, natural gas, wherein further method steps and gas mixtures can also be involved in the formation of the first feed mixture, as explained below. Furthermore, the present invention provides for the second feed mixture to be formed using at least one portion of the first permeate, and for the third feed mixture to be formed using at least one portion of the second retentate. The present invention comprises processing the second permeate at least partially by pressure-swing adsorption to obtain the pure helium and a remaining mixture. A corresponding remaining mixture is also referred to as "tail gas." It comprises, in particular, the components adsorbed in the pressure-swing adsorption during an adsorption stroke, along with a portion of the components in the interstices of the adsorbent which are not adsorbed at the end of the adsorption stroke. Non-adsorbed helium is also included therein.

A substantial aspect of the present invention is to guide at least a portion of the third permeate and/or at least a portion of the third retentate back into the method. In contrast to the method described in Ullmann's Encyclopedia of Industrial Chemistry mentioned at the outset, in which the entire retentate is recirculated back to a second membrane separation stage, in this way, an optimization of the respective material compositions of the feed mixtures to the individual membrane separation stages can be achieved, and, in this way, the separation in such membrane separation stages can be influenced particularly advantageously. Details and specific advantages will be explained below with reference to the preferred embodiments of the present invention.

According to the present invention, at least a portion of the remaining mixture is used in the formation of the second feed mixture, and at least a portion of the third permeate is used in the formation of the second feed mixture. The remaining mixture or its portion used in the formation of the second feed mixture, the first permeate or its portion used in the formation of the second feed mixture, and the third permeate or its portion used in the formation of the second feed mixture are combined and jointly compressed and subjected to carbon dioxide removal after being combined and jointly compressed. Or the remaining mixture or its portion used in the formation of the second feed mixture and the third permeate or its portion used in the formation of the second feed mixture are combined and jointly compressed, separately from the first permeate or its portion used in the formation of the second feed mixture, and subjected to carbon dioxide removal after they are combined and jointly compressed. Or the third permeate or its portion used in the formation of the second feed mixture and the first permeate or its portion used in the formation of the second feed mixture are combined and jointly compressed, separately from the remaining mixture or its portion used in the formation of the second feed mixture; in all three cases, the carbon dioxide removal is carried out using an adsorption process in which at least one rinsing and displacement gas is used, and at least one portion of the second or third retentate is used as the or one of the rinsing and displacement gases.

The adsorption process is carried out by using at least one rinsing and displacement gas. A corresponding rinsing and displacement gas can be used, in particular, to regenerate adsorption units or to discharge gases therefrom. It is particularly advantageous if the or one of the rinsing and displacement gases comprises at least one portion of the second or third retentate. In this way, a particularly good helium yield can be achieved.

In a particularly preferred embodiment of the present invention, at least one portion of the third retentate is used in the formation of the first feed mixture, i.e., is fed to the starting mixture or to a portion of the starting mixture used in the formation of the first feed mixture. In this way, in embodiments of the present invention, either the content of helium in the first feed mixture can be influenced, or at least the amount of the first feed mixture used in the first membrane separation stage can be increased overall. In the former case, the concentration of helium in the first feed mixture, in particular, can be influenced, so that the driving force in the first membrane separation stage can likewise be influenced.

In particular, because the helium molecules contained in the substream of the third retentate are conducted through the corresponding membrane stage once more, the membrane surface installed in the third membrane stage can be reduced through a corresponding recirculation, since a lower helium yield is sufficient there, while at the same time the concentration in the first feed mixture, and thus the driving force, are increased as a result.

An increase in yield can occur, in particular, when the first membrane separation stage is operated as a so-called yield stage. One speaks of a yield stage when, by the choice of the membrane surface used, such a membrane separation stage is optimized in such a way that a largest possible proportion of the helium contained in the respective feed mixture passes into the permeate, whereas the smallest possible proportion remains in the retentate. It is therefore the purpose of a yield stage to convey the largest possible proportion of helium from the respective feed mixture into the corresponding permeate and to lose as little helium as possible over the retentate. In this case, however, it is typically not possible to prevent other components contained in the feed mixture from also passing into the permeate and the helium concentration in the permeate of such a yield stage from being relatively low, since, for the most complete possible conveyance of the helium into the permeate, it is accepted that other components also pass into the permeate to a considerable extent.

Even in the latter case, in which the third retentate has, for example, the same or essentially the same helium concentration as the starting mixture or the proportion thereof used in the formation of the first feed mixture, the overall yield of helium can be increased overall in this process. The cause will be explained below.

By recirculating at least a portion of the third retentate and using it in the formation of the first feed mixture, an advantage can be achieved even if a low(er) or at least no increased helium concentration results from this in the first separation insert of the first membrane separation stage operated as a yield stage. This results, in particular, from the large membrane surface which is advantageously used in this yield stage and the relative reduction in the amount of permeate relative to the membrane surface. This reduces the pressure loss on the permeate side of the yield stage. A corresponding pressure loss leads to the permeate pressure on the low-pressure side increasing over the length of a corresponding membrane stage. Consequently, the pressure gradient, and thus also the driving force, are reduced. If this pressure loss is reduced, the permeate pressure of helium can be kept constantly low over the entire membrane length, and, in this way, in turn, the driving force for the helium between the high-pressure side and the low-pressure side of the membrane can be increased.

According to the present invention, at least one portion of the remaining mixture is used in the formation of the second feed mixture. This procedure allows particularly efficient operation of the second membrane separation stage, which is additionally impinged upon with the remaining mixture, since, in this way, an increase in the concentration of helium can be effected. This improves the separation in the second membrane separation stage, which is preferably not operated as a yield stage, but in which the highest possible content of helium in the permeate is to be achieved, and which is therefore an enrichment stage or purification stage.

In the pressure-swing adsorption, which can be carried out within the framework of the present invention using one or more pressure-swing adsorption steps, pure helium as a product, on the one hand, and a remaining mixture completely freed of helium, on the other, cannot, due to the principle, be simultaneously formed. Rather, the remaining mixture still contains considerable amounts of helium. The helium concentration in the remaining mixture is typically above that of the first permeate, which is otherwise at least partially used in the formation of the second separation insert.

The yield stages explained above are preferably operated in such a way that at least 80% of the helium contained in the respective feed mixture passes into the permeate. Larger proportions of the helium contained in the feed mixture in each case can also be conveyed into the permeate—for example, at least 90%, 95%, or 99%. In this way, the retentate formed in each case is poor in or essentially free of helium and therefore does not need to be supplied to further processing in order to recover helium contained therein. The additionally circulated volumes increase the higher the desired yield of the overall system, and thus the yield of the yield stage, is. Also, the energy requirement will increase as a result of an increasing proportion of circulated volume.

Advantageously, the second permeate, which is at least partially processed through the pressure-swing adsorption to obtain the pure helium and the remaining mixture, has a content of 20 to 80 mol %—in particular, 35 to 65 mol %—of helium. In this way, the pressure-swing adsorption can be carried out particularly efficiently and with a yield of particularly high purities of the helium product.

In order to achieve the particular advantages of the present invention, the remaining mixture from the pressure-swing adsorption advantageously has a content of 10 to 70 mol %—in particular, 20 to 50 mol %—of helium.

According to the present invention, the remaining mixture or its portion used in the formation of the second feed mixture, the first permeate or its portion used in the formation of the second feed mixture, and the third permeate or its portion used in the formation of the second feed mixture are combined and jointly compressed. A supply to the second membrane separation stage then takes place in the form or as a portion of the second feed mixture. In this way, the gas mixtures explained can, using only one compressor, be brought to a pressure which is required for feeding into the second membrane separation stage.

In the explained case, a compression of the second permeate and a removal of hydrogen is, advantageously, carried out upstream of the pressure-swing adsorption method. In principle, however, it is also possible, first, to remove hydrogen, and then to carry out the pressure-swing adsorption, and, thereafter, a compression, as is also explained, in particular, with reference to embodiments shown in the drawings.

Within the framework of the present invention, the remaining mixture or its portion used in the formation of the second feed mixture, the first permeate or its portion used in the formation of the second feed mixture, and the third permeate or its portion used in the formation of the second feed mixture are advantageously subjected to carbon dioxide removal after they are combined and jointly compressed. Corresponding gas mixtures contain carbon dioxide, in particular, when the first membrane separation stage is operated as an explained yield stage. In particular, in such a case, appreciable amounts of carbon dioxide can pass into the permeate in addition to helium. The carbon dioxide removal within the scope of the present invention can be designed, in particular, in the form of a pressure-swing adsorption, in a temperature change adsorption, or a membrane method, as they are known in principle from the prior art.

According to the present invention, the remaining mixture or its portion used in the formation of the second feed mixture and the third permeate or its portion used in the formation of the second feed mixture can be combined and compressed together with the first permeate or its portion used in the formation of the second feed mixture. In this way, a specific pressure adaptation is possible, wherein, in each case, different pressure increases can be realized.

In the embodiment of the present invention just explained, the remaining mixture or its portion used in the formation of the second feed mixture and the third permeate or its portion used in the formation of the second feed mixture are, advantageously, subjected to carbon dioxide removal after they are combined and jointly compressed. In other words, here, carbon dioxide removal is performed upstream of the second membrane separation stage in the recirculated proportions. Carbon dioxide removal at this point greatly limits the enrichment within the circuit formed. In this way, only carbon dioxide from the starting mixture is present before the second membrane separation stage, which mixture passes into the first permeate and is supplied to the second membrane separation stage in the second separation insert. Although the carbon dioxide content is enriched by the first membrane separation stage, the carbon dioxide content is not increased by additional carbon dioxide from the recirculation of the remaining mixture or of the third permeate or corresponding portions. The stream to be treated during the carbon dioxide removal in the recirculation is also smaller and more strongly enriched with carbon dioxide, which can potentially make carbon dioxide removal more convenient. It is also possible to operate these, optionally, at a more favorable, intermediate pressure level. In this case, advantages and disadvantages, in comparison with the embodiment explained below, must be weighed against one another.

The present invention advantageously comprises combining the third permeate or its portion used in the formation of the second feed mixture and the first permeate or its portion used in the formation of the second feed mixture, and compressing them jointly, separately from the remaining mixture or its portion used in the formation of the second feed mixture. Within the framework of the present invention, in particular, compression of low pressure to medium pressure, and then to high pressure, as explained below, between the second and the third membrane stages is possible. In doing so, in particular the retentate of the third membrane separation stage is advantageously guided back in front of the first membrane separation stage. In this case, the retentate of the third membrane separation stage has a very similar helium concentration to that of the first separation insert or the proportion of the starting mixture used to form this first separation insert.

In the present invention, the third permeate or its portion used in the formation of the second feed mixture and the first permeate or its portion used in the formation of the second feed mixture are, advantageously, subjected to carbon dioxide removal after they are combined and jointly compressed. In this way, all of the carbon dioxide, i.e., also that from the feed mixture or first permeate, can be removed.

As already mentioned, the second permeate or its portion processed by pressure-swing adsorption can be subjected to at least partial hydrogen removal. In this way, it is possible to prevent excess amounts of hydrogen from passing into the pure helium and/or, in the method, accumulating in the circuits formed. A corresponding hydrogen removal can, in particular, be carried out catalytically, wherein hydrogen is reacted with oxygen to form water. The water formed can easily be removed from the method.

As already explained, the method according to the invention can, in principle, be carried out using different pressure levels. The first membrane separation stage can thus be carried out at a pressure level of 10 to 120 bar, the second membrane separation stage at a pressure level of 10 to 120 bar, and the third membrane separation stage at a pressure level of 10 to 120 bar. In an alternative embodiment, it is possible to operate the first membrane separation stage at a pressure level of 30 to 100 bar, the second membrane separation stage at a pressure level of 30 to 100 bar, and the third membrane separation stage at a pressure level of 30 to 100 bar.

The pressure levels of the first through third membrane separation stages can, in particular, be the same. However, different pressure levels may also, optionally, be used. In particular, the first and the third membrane separation stages can, advantageously, be operated at the same pressure level. The reason for this is the recirculation of the third retentate to the first membrane separation stage. Although it would be possible to operate the third membrane separation stage at a lower or higher pressure level than the first, in the first case, an equally large mass flow would nevertheless be compressed, without thereby being able to at least spare membrane surface in the third membrane separation stage, whereas, in the second case, previously applied compression energy would be lost again, at least partially, during the return to the feed pressure level. The second membrane separation stage could be operated at a deviating pressure level. At identical pressure levels, the method according to the invention can be carried out by means of only one compressor in the high-pressure path.

The present invention also extends to a system for extracting pure helium, having a first membrane separation stage, a second membrane separation stage, and a third membrane separation stage, wherein means are provided which are configured to supply a first helium-containing feed mixture to the first membrane separation stage, a second helium-containing feed mixture to the second membrane separation stage, and a third helium-containing feed mixture to the third membrane separation stage. The first membrane separation stage is configured to form a first permeate and a first retentate. The second membrane separation stage is configured to form a second permeate and a second retentate. The third membrane separation stage is configured to form a third permeate and a third retentate. The system according to the invention is characterized by means configured to form the first feed mixture using at least one portion of a helium-containing starting mixture, to form the second feed mixture using at least one portion of the first permeate, to form the third feed mixture using at least one portion of the second retentate, to process the second permeate at least partially to obtain the pure helium and a remaining mixture by pressure-swing adsorption, and to guide at least one portion of the third permeate and/or at least one portion of the third retentate back into the method.

With regard to features and advantages of a corresponding system, which, advantageously, has means which enable it to carry out a method in the embodiments explained above, reference is expressly made to the above explanations.

Embodiments of the invention are described in more detail below with reference to the accompanying drawings.
Brief description of the drawings FIG. 1 shows a method according to an embodiment of the invention in the form of a schematic process flow diagram.

DETAILED DESCRIPTION OF THE DRAWINGS

In the figures, elements functionally or structurally corresponding to one another are indicated by reference signs corresponding to one another and are not explained repeatedly for the sake of clarity. The following explanations relate to methods and corresponding systems in the same way. It is understood that corresponding systems or methods can, in practice, also comprise optional or obligatory further components or method steps. These are not shown in the following figures, only for the sake of clarity.

Figure 1:
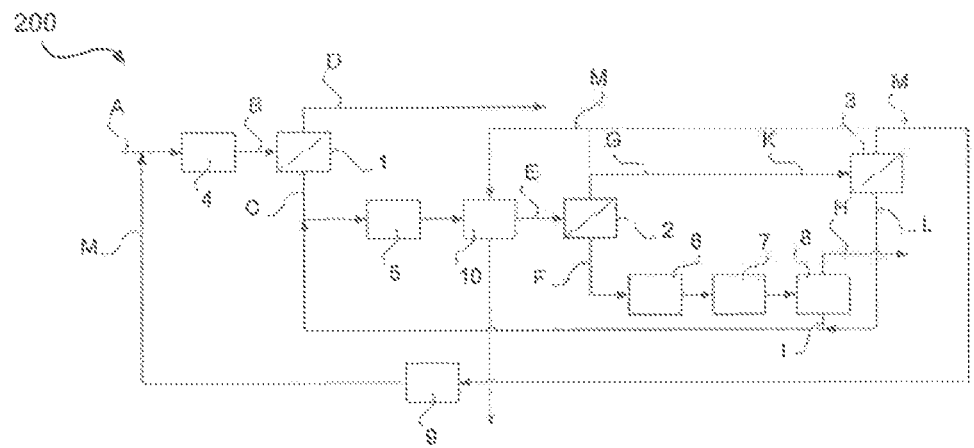

In FIG. 1, a method according to an embodiment of the invention is shown in the form of a schematic process flow diagram and is designated as a whole by 200. The core of the method is, in particular, a first membrane separation stage 1, a second membrane separation stage 2, and a third membrane separation stage 3.

In the method 200, a starting mixture A of the kind previously explained is supplied, and, optionally, prepared in any desired preparation steps (not shown). The starting mixture A is combined with a stream M (see below) and supplied to an optional heating 4. Thus, using the starting mixture A or a portion thereof, a first feed mixture B is formed, which is supplied to the first membrane separation stage 1.

In the first membrane separation stage 1, a first permeate C and a first retentate D are formed. Using the first permeate or a portion thereof, a second feed mixture E is formed by compression 5 and supplied to the second membrane separation stage 2.

In the second membrane separation stage 2, a second permeate F and a second retentate G are formed. In the example shown, the second permeate F, after a compression 6 and hydrogen removal 7, is at least partially subjected to a pressure-swing adsorption 8. In this, pure helium H as a product and a remaining mixture I are formed.

At the same time, the retentate G of the second membrane separation stage 2 is supplied to the third membrane separation stage 3, i.e., a third feed mixture K is formed using at least one portion of the second retentate G. In the third membrane separation stage 3, a third permeate L and a third retentate M are formed.

In the example shown, the remaining mixture I and the third permeate L are now combined with one another and with the first permeate C, and subjected to the compression 5. Thus, the second feed mixture E is formed using the remaining mixture I, the third permeate L, and the first permeate C.

Further, in the illustrated embodiment, the third retentate M is used in the formation of the first feed mixture B and—in particular, as part thereof—subjected to the optional heating 4. In particular, if required, a corresponding compression 9 can take place, which likewise effects a heating.

In addition, carbon dioxide removal 10 is shown here. In the carbon dioxide removal 10, a rinsing and displacement gas M may be used, which is formed using at least one portion of the second and/or the third retentates G and M, respectively.

Figure 2:
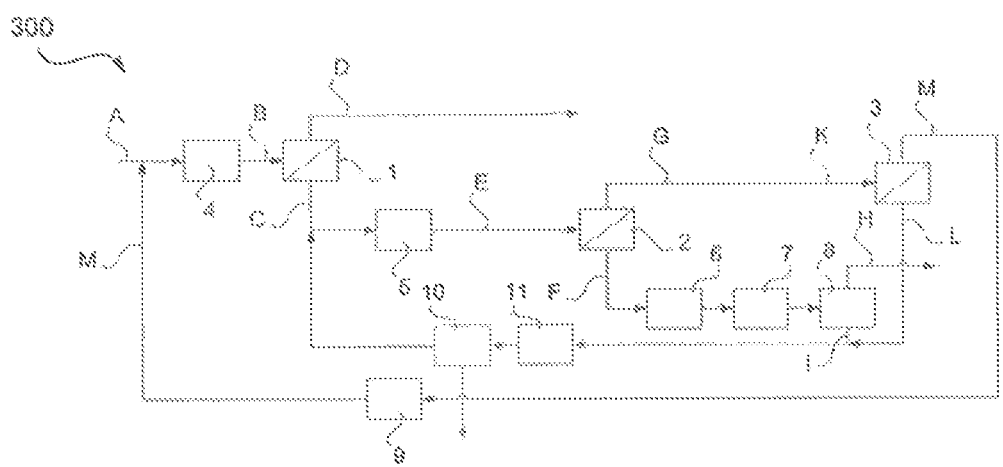
FIG. 2 shows a method according to an embodiment of the invention in the form of a schematic process flow diagram.

In FIG. 2, a method of a further embodiment of the present invention is shown in the form of a schematic process flow diagram and is designated as a whole by 300. The method 300 according to FIG. 2 differs from the method 200 according to FIG. 1, in particular, in the positioning of the carbon dioxide removal 10. While, in the method 200 according to FIG. 1, the carbon dioxide removal 10 takes place upstream of the second membrane separation stage 2, and the explained first and third permeates C and L, along with the remaining mixture I, are thereby processed, in the method 300 illustrated in FIG. 2, carbon dioxide removal 10 takes place from only the remaining mixture I and the third permeate L, which are supplied separately from the second permeate C to the carbon dioxide removal 10 for this purpose and are subjected separately therefrom to compression 11. Compression 5 therefore does not have to take place. Optionally, however, a feeding to an intermediate stage of a compressor used in the compression 5 can also take place.

Figure 3:
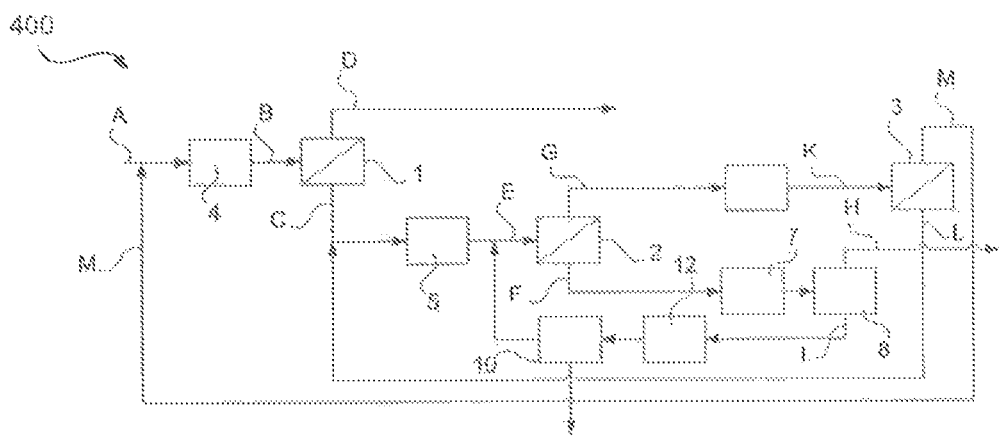
FIG. 3 shows a method according to an embodiment of the invention in the form of a schematic process flow diagram.

In FIG. 3, a method according to a further embodiment of the present invention is shown in the form of a schematic process flow diagram and is designated as a whole by 400. The method 400 according to FIG. 3 represents a variant compared to the methods 200 or 300. The carbon dioxide removal 10 takes place here from the remaining mixture I of the pressure-swing adsorption 8. A corresponding separate compression 12 takes place for this purpose.

It is understood that the method variants shown in the previously explained figures may also be used in combination and independently from one another, as long as the scope of the present invention, which is defined by the appended claims, is not departed from.

The invention claimed is:

1. A method for extracting pure helium using a first membrane separation stage, a second membrane separation stage, and a third membrane separation stage, said method comprising:
   supplying a first helium-containing feed mixture to the first membrane separation stage, supplying a second helium-containing feed mixture to the second membrane separation stage, and supplying a third helium-containing feed mixture to the third membrane separation stage,
   forming a first permeate and a first retentate in the first membrane separation stage, forming a second permeate and a second retentate in the second membrane separation stage, and forming a third permeate and a third retentate in the third membrane separate stage,
   wherein the first feed mixture is formed using at least one portion of a helium-containing starting mixture, the second feed mixture is formed using at least one portion of the first permeate, and the third feed mixture is formed using at least one portion of the second retentate,
   wherein the second permeate is at least partially processed by pressure swing adsorption to obtain the pure helium and a remaining mixture, and at least one portion of the third permeate and/or at least one portion of the third retentate is guided back into the method, wherein at least one portion of the remaining mixture is used in the formation of the second feed mixture, and at least one portion of the third permeate is used in the formation of the second feed mixture,
   wherein the remaining mixture or the portion thereof used in the formation of the second feed mixture, the first permeate or the portion thereof used in the formation of the second feed mixture, and the third permeate or the portion thereof used in the formation of the second feed mixture are combined and jointly compressed and subjected to carbon dioxide removal after they are combined and jointly compressed,
   or
   wherein the remaining mixture or the portion thereof used in the formation of the second feed mixture and the third permeate or the portion thereof used in the formation of the second feed mixture are combined and jointly compressed, separately from the first permeate or the portion thereof used in the formation of the second feed mixture, and subjected to carbon dioxide removal after they are combined and jointly compressed,
   or
   wherein the third permeate or the portion thereof used in in the formation of the second feed mixture and the first permeate or the portion thereof used in the formation of the second feed mixture are combined and jointly compressed, separately from the remaining mixture or its portion used in the formation of the second feed mixture, and subjected to carbon dioxide removal after they are combined and jointly compressed, and
   wherein the carbon dioxide removal is carried out using an adsorption process in which at least one rinsing and displacement gas is used, and at least one portion of the second or third retentate is used as the or one of the rinsing and displacement gases.

2. The method according to claim 1, in which at least one portion of the third retentate is used in the formation of the first feed mixture.

3. The method according to claim 1, in which the second permeate or the portion thereof processed by pressure-swing adsorption is subjected to hydrogen removal.

4. The method according to claim 1, in which the first membrane separation stage is operated at a pressure level of 10 to 120 bar.

5. The method according to claim 1, wherein the second membrane separation stage is operated at a pressure level of 10 to 120 bar.

6. The method according to claim 1, wherein the third membrane separation stage is operated at a pressure level of 10 to 120 bar.

7. The method according to claim 1, wherein the first membrane separation stage is operated at a pressure level of 10 to 120 bar, the second membrane separation stage is operated at a pressure level of 10 to 120 bar, and the third membrane separation stage is operated at a pressure level of 10 to 120 bar.

8. The method according to claim 1, wherein the first membrane separation stage is operated at a pressure level of 30 to 100 bar.

9. The method according to claim 1, wherein the second membrane separation stage is operated at a pressure level of 30 to 100 bar.

10. The method according to claim 1, wherein the third membrane separation stage is operated at a pressure level of 30 to 100 bar.

11. The method according to claim 1, wherein the first membrane separation stage is operated at a pressure level of 30 to 100 bar, the second membrane separation stage is operated at a pressure level of 30 to 100 bar, and the third membrane separation stage is operated at a pressure level of 30 to 100 bar.

12. The method according to claim 1, wherein, prior to being subjected to pressure-swing adsorption, at least a portion of the second permeate is subjected to hydrogen removal.

13. The method according to claim 1, wherein, prior to being subjected to pressure-swing adsorption, at least a portion of the second permeate is subjected to compression and hydrogen removal.

14. The method according to claim 1, wherein the remaining mixture or the portion thereof used in the formation of the second feed mixture, the first permeate or the portion thereof used in the formation of the second feed mixture, and the third permeate or the portion thereof used in the formation of the second feed mixture are combined and jointly compressed and subjected to carbon dioxide removal after they are combined and jointly compressed.

15. The method according to claim 1, wherein the remaining mixture or the portion thereof used in the formation of the second feed mixture and the third permeate or the portion thereof used in the formation of the second feed mixture are combined and jointly compressed, separately from the first permeate or the portion thereof used in the formation of the second feed mixture, and subjected to carbon dioxide removal after they are combined and jointly compressed.

16. The method according to claim 1, wherein the third permeate or the portion thereof used in in the formation of the second feed mixture and the first permeate or the portion thereof used in the formation of the second feed mixture are combined and jointly compressed, separately from the remaining mixture or its portion used in the formation of the second feed mixture, and subjected to carbon dioxide removal after they are combined and jointly compressed.

17. The method according to claim 1, wherein, prior to being used in the formation of the second feed mixture, the at least one portion of the remaining mixture is separately subjected to compression.

18. A system for extracting pure helium, comprising:
a first membrane separation stage, a second membrane separation stage, and a third membrane separation stage,
means configured to supply a first helium-containing feed mixture to the first membrane separation stage, a second helium-containing feed mixture to the second membrane separation stage, and a third helium-containing feed mixture to the third membrane separation stage,
wherein the first membrane separation stage is configured to form a first permeate and a first retentate, the second membrane separation stage is configured to form a second permeate and a second retentate, and the third membrane separation stage is configured to form a third permeate and a third retentate,
means configured to form the first feed mixture using at least one portion of a helium-containing starting mixture, means configured to form the second feed mixture using at least one portion of the first permeate, and means configured to form the third feed mixture using at least one portion of the second retentate,
means to process the second permeate at least partially to obtain the pure helium and a remaining mixture through pressure-swing adsorption, and
means to guide at least one portion of the third permeate and/or at least one portion of the third retentate back into the method,
wherein at least one portion of the remaining mixture and at least one portion of the third permeate are guided back into the first permeate, and
means for combining the remaining mixture and the third permeate with the first permeate and means for subjecting the resultant combined streams to carbon dioxide removal after they are combined, wherein the means for carbon dioxide removal includes means for adsorption of carbon dioxide and at least one means for introducing a rinsing or displacement gas, and wherein said at least means for introducing a rinsing or displacement gas introduces at least one portion of the second or third retentate as the or one of the rinsing and displacement gases in the adsorption process.

* * * * *